United States Patent [19]
Sutter

[11] 3,736,666
[45] June 5, 1973

[54] UNIVERSAL SINE DEVICE

[75] Inventor: Franz Sutter, Niederdorf, Basel-Land, Switzerland

[73] Assignee: Institut Dr. Ing. Reinhard Straumann AG, Waldenburg, Switzerland

[22] Filed: Aug. 31, 1970

[21] Appl. No.: 68,064

[30] Foreign Application Priority Data

Sept. 5, 1969   Switzerland..........................13473/69

[52] U.S. Cl.............................................33/174 TC
[51] Int. Cl. .................................................B23q 3/00
[58] Field of Search ......................33/174 S, 174 TA, 33/174 TB, 174 TC, 174 TD; 51/216 A, 216 ND, 216 H, 217 A

[56] References Cited

UNITED STATES PATENTS

| 1,324,681 | 12/1919 | McDonald | 33/174 TD |
| 2,178,264 | 10/1939 | Meyer | 33/174 TD |
| 3,187,737 | 6/1965 | Oscar | 33/174 S |
| 2,538,640 | 1/1951 | Click | 33/174 TD |
| 2,572,220 | 10/1951 | Vidales | 51/216 A |

FOREIGN PATENTS OR APPLICATIONS

| 1,115,101 | 4/1956 | France | 33/174 S |

OTHER PUBLICATIONS

American Machinist, 2/26/48 page 247.

Primary Examiner—Robert B. Hull
Assistant Examiner—Richard R. Stearns
Attorney—McGlew and Toren

[57] ABSTRACT

A sine device comprises modified standard fixtures found in every workshop and which can be assembled to form a sine table having a greater range of tilting movement than commercially available sine tables. The sine device comprises a first angle plate having a horizontal leg and a vertical leg, and a second angle plate, constituting a tilting table, having a vertical leg pivotally mounted on the vertical leg of the first angle plate for tilting about a horizontal axis. Pin means are disengageably insertable in apertures in the vertical leg of the first angle plate to serve, either alone or in combination with gauge blocks, as references and supports for the tiltable table in any angularly adjusted position of the table. The horizontal leg of the table may be formed with inverted T-slots and apertures whereby various components may be adjustably positioned thereon, such components including, for example, a commercial sine table, a vise, or the like. The vertical leg of the table may be formed with a suitable scale of anuglar graduations and a circular series of apertures to receive locating pins engageable in a locating aperture in the vertical leg of the first angle plate. All or most of the elements are usable separately and independently of each other.

2 Claims, 7 Drawing Figures

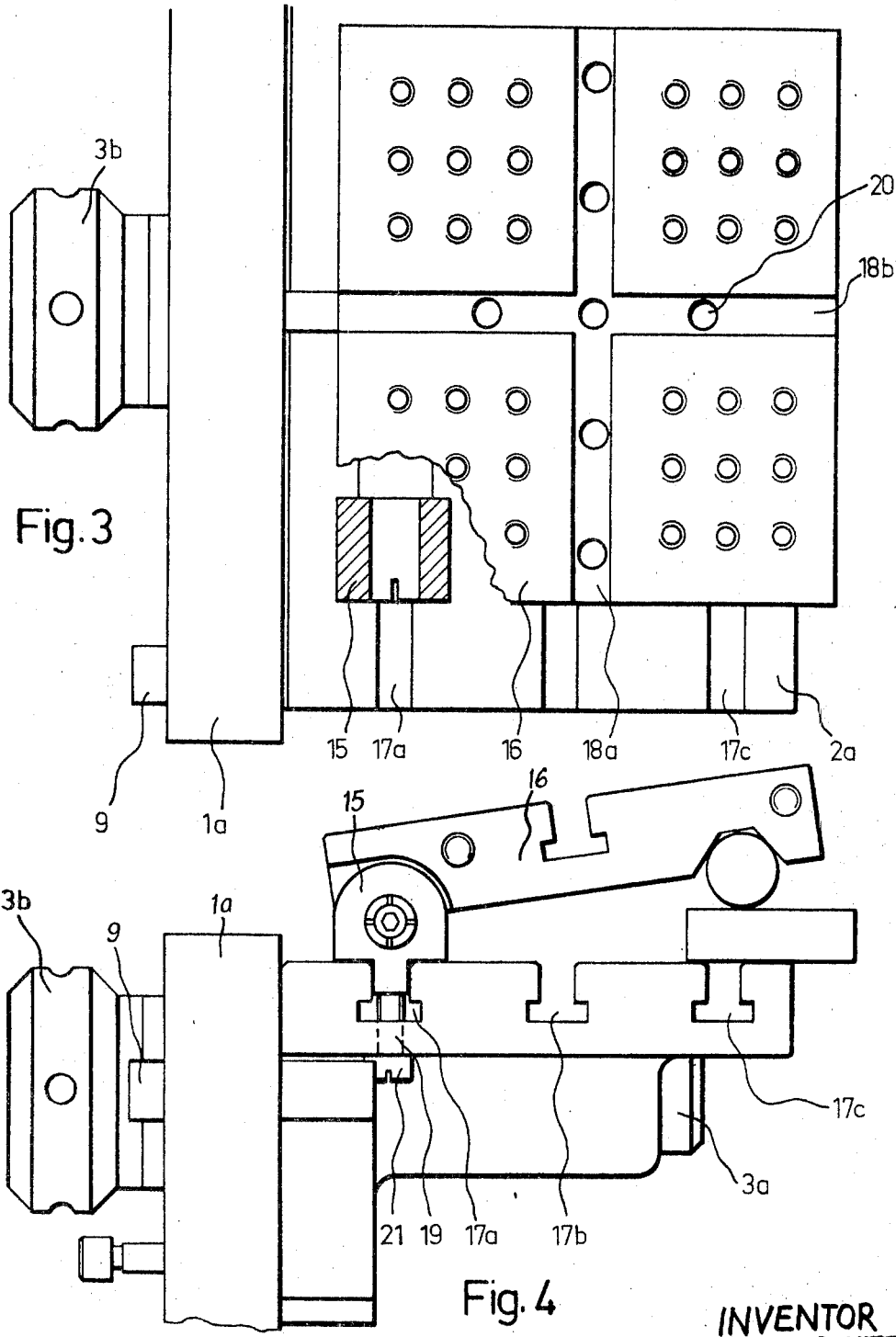

INVENTOR
FRANZ SUTTER
BY McGraw & Toren
ATTORNEYS

UNIVERSAL SINE DEVICE

BACKGROUND OF THE INVENTION

Sine devices or sine tables are well-known positioning devices for precision grinding, milling, boring, etc., for example, in toolrooms and workshops. Compound sine tables are useful for special jobs where the work piece has to be positioned with respect to three mutually perpendicular dimensions. The high cost of commercially available sine tables, particularly compound sine tables, combined with the usually limited opportunities for their use, prohibits many smaller workshops from purchasing commercial sine tables. Such smaller workshops are thus forced to resort to makeshift arrangements when the need arises.

SUMMARY OF THE INVENTION

This invention relates to sine devices and, more particularly, to a novel and inexpensive sine device assembled from modified standard elements found in every workshop and having as high accuracy and a greater range of angular adjustment than commercially available sine tables.

In accordance with the invention, an angle plate has mounted, on a vertical leg, a second inverted angle plate hereinafter referred to as a "tilting table". The tilting table is mounted in such a fashion that it can be tilted in either angular direction about a horizontal axis and held at any desired angular orientation by means of a locking device, such as a bolt and nut. One or more removable pins serve as supports for the tilting table or for gauge blocks inserted between the bottom surface of the tilting table baseplate and the pins, in order to form any desired angle in accordance with the sine principle. The removable pins are fitted into bores or apertures in the vertical leg of the angle plate. All of the components can be disengaged and used independently, if desired or required.

The baseplate of the tilting table thus serves as a sine table, if used in conjunction with the angle plate. However, the angle plate mounting the tilting table can be used independently as an angle plate. Any desired device can be mounted on the surface of the baseplate of the tilting table, for example, a vise, a turntable, a dividing head or a V-block. By mounting a commercially available sine table on the baseplate of the tilting table, the effect of a compound sine table is attained without the expense involved in purchasing a compound sine table, which can only be used for a single purpose.

If the surface of the baseplate of the tilting table is designed appropriately, the same effect can be attained with only the upper half of a normal or commercial sine table, with the baseplate itself serving as the lower half.

The sine device of the invention is, in fact, not only equal, but better than a commercially available, single purpose sine plate, for several reasons. Thus, the tilting table of the sine device of the invention can be tilted in either direction around its supporting axis. Also, any angle, up to 90°, can be formed, contrary to "normal" or commercially available sine tables which, in practice, are limited to an angle of about 60°. Finally, the accuracy of registration does not decrease with increasing angles, because the pin or pins supporting the gauge blocks can be displaced into a lower bore so that, in effect, a smaller angle can be maintained with fewer gauge blocks, as will be described hereinafter.

An object of the invention is to provide an improved sine device comprising modified standard fixtures.

Another object of the invention is to provide such a sine device in which the modified standard fixtures may be used independently of each other.

A further object of the invention is to provide such a sine device in which the modified standard fixtures may be used as components for a single sine device or a compound sine device at the option of the user.

Another object of the invention is to provide such a sine device in which the initial outlay is limited by virtue of a "building block" design.

A further object of the invention is to provide such a sine device in which the user can expand its capabilities by subsequent purchases of further attachments.

For an understanding of the principles of the invention, reference is made to the following description of typical embodiments thereof as illustrated in the accompanying drawings.

BRIEF DESCRIPTION OF THE DRAWINGS

In the drawings:

FIG. 3 is a top plan view, partly broken away and partly in section, of a modification of the sine device in accordance with the invention;

FIG. 4 is an end elevation view corresponding to FIG. 3;

DESCRIPTION OF THE PREFERRED EMBODIMENTS

Figure 1:
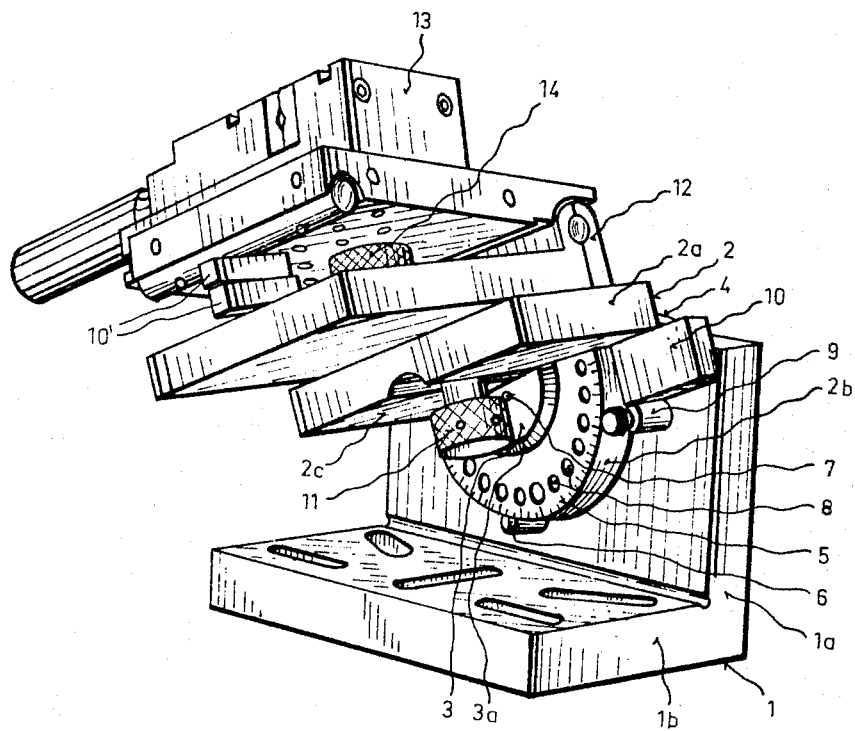
FIG. 1 is a perspective view of one embodiment of sine device in accordance with the invention.
Figure 2:
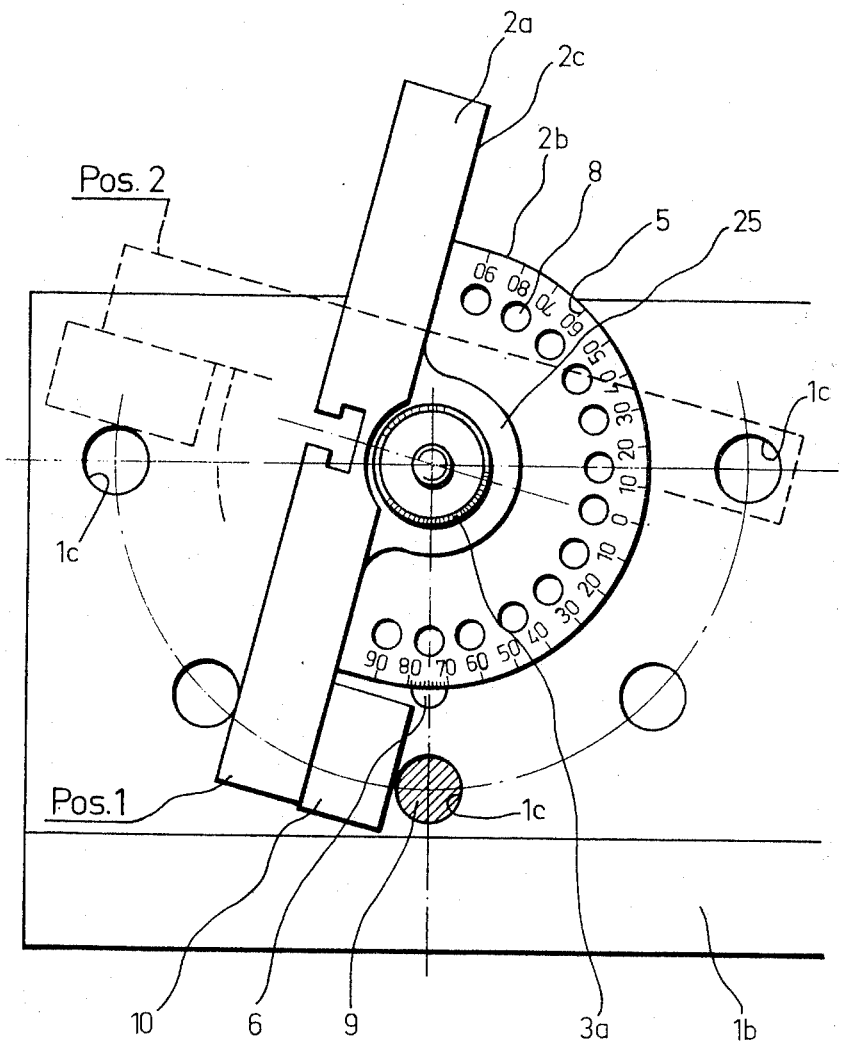
FIG. 2 is a front elevation view of the sine device shown in FIG. 1.

Referring first to FIGS. 1 and 2, a supporting angle plate 1 has legs 1a and 1b perpendicular to each other. A tilting table 2, consisting of a baseplate 2a and a semi-circular, vertical bearing plate 2b, is attached to leg 1a of angle plate 1 by means of a bolt 3, having a machined head 3a. Bolt 3 and its head 3a act as a bearing, through semi-circular bearing plate 2b and vertical leg 1a of angle plate 1. The bolt 3 has a threaded end receiving a nut 3b serving to anchor tilting table 2 in any selected angular position on vertical leg 1a of angle plate 1.

It is desirable to provide either bearing plate 2b or vertical leg 1a of angle plate 1 with a scale or graduation 5, to facilitate reading of the angular position of baseplate 2a. Such graduation or scale may be provided in addition to a circular row of bores 8, in either bearing plate 2b or vertical leg 1a of angle plate 1, and which are useful when frequently occurring angles must be established quickly and accurately.

Irrespectively of these two desirable features, it is necessary that vertical leg 1a of angle plate 1 be formed with at least two symmetrical bores 1c on either side of and at the same height as the tilting axis which is the axis of bolt 3. These bores are designed to receive a reference pin 9, whose radius must be equal to the distance between the tilting axis and the nearer surface 2c of baseplate 2a. Stated in another way, if two identical reference pins 9 are inserted into two bores 1c, tilting table 2a must be immobilized in a horizontal position, i.e., parallel to the horizontal leg 1b of angle plate 1.

While two bores 1c would be sufficient to permit accurate registration of the tilting table by means of gauge blocks through the angles usable with commercial sine tables or devices, larger angles, up to 90°, can be used if at least one more bore 1c is provided on the circle immediately above and on a perpendicular to leg 1b of angle plate 1, as shown in FIG. 2.

The arrangement shown in FIG. 1 illustrates how the assembly can be made to function as a compound sine table, using one or more gauge blocks 10 each interposed between a pin 9 and the surface 2c of tilting table 2a. By means of a screw 11, a commercially available sine table 12 is secured on the surface of baseplate 2a further from the tilting axis. Correct position is made easier by means of small location blocks 10' between the two adjoining surfaces. In the same way a vise 13, or any other attachment, can be fixed on baseplate 2a, or on top of sine table 12, by means of a screw 14.

By securing only an upper half of a sine table, this upper half being the sine plate, by means of two hinge blocks on the further surface of baseplate 2a, and locating and fixing these hinge blocks with pins and screws, the assembly shown in FIG. 1 becomes the equivalent of a compound sine table without possessing the shortcomings so often found in make-shift contraptions used when a commercial compound sine table is not available.

FIGS. 3 and 4 illustrate another manner of assembling the components. In this arrangement, tilting table 2a and sine plate 16 are provided with T-slots 17 and 18, respectively, as locations for hinge blocks 15 or any other attachments. The attachments are fixed in position by screws 21 extending through clearance holes 19 and 20, tilting table 2a and sine plate 16, respectively.

Figure 5:
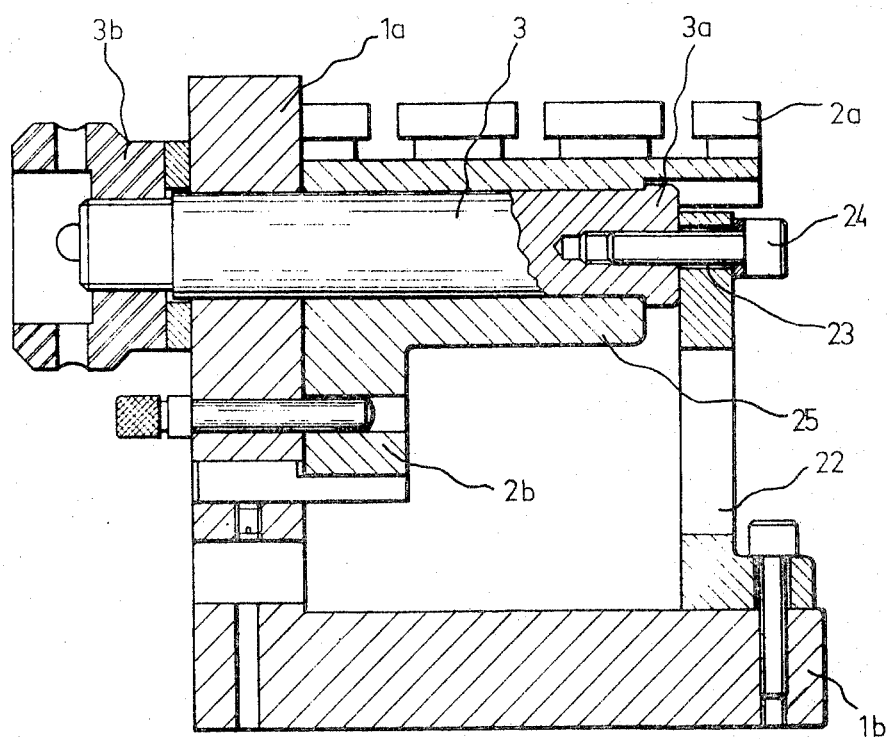
FIG. 5 is a vertical transverse sectional view illustrating a further modification of the sine device.

To prevent deflection of tilting table 2a by unusually heavy loads, a detachable supporting leg 22, as shown in FIG. 5, can be secured to the upper surface of horizontal leg 1b of angle plate 1. Supporting leg 22 is formed, at the height of the tilting axis, with an aperture 23 acting as a further bearing for bolt 3 or as a clearance hole for a fixation screw 24, threaded axially into bolt 3, to assure a rigid connection. A boss 25 on the nearer surface 2c of baseplate 2a, as shown in FIGS. 2 and 5, is advantageous and acts as a guide for bolt 3.

A very important feature of the universal sine device of the invention is its "building block" design, which enables the customer to use the main components as separate, independent tools, such as two angle plates, a sine table, a sine plate, a vise, etc.

Figure 6:
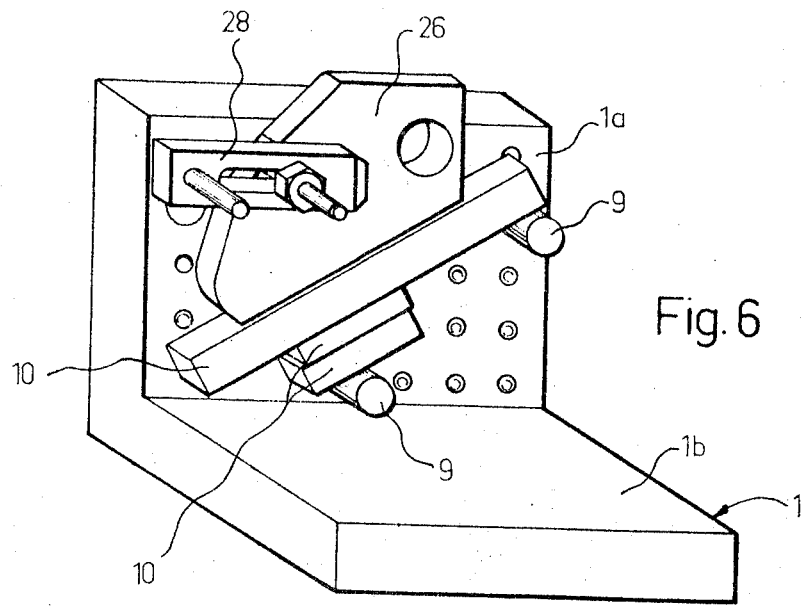
FIGS. 6 and 7 are perspective views illustrating the supporting angle as used independently of the tilting table, for other applications.
Figure 7:
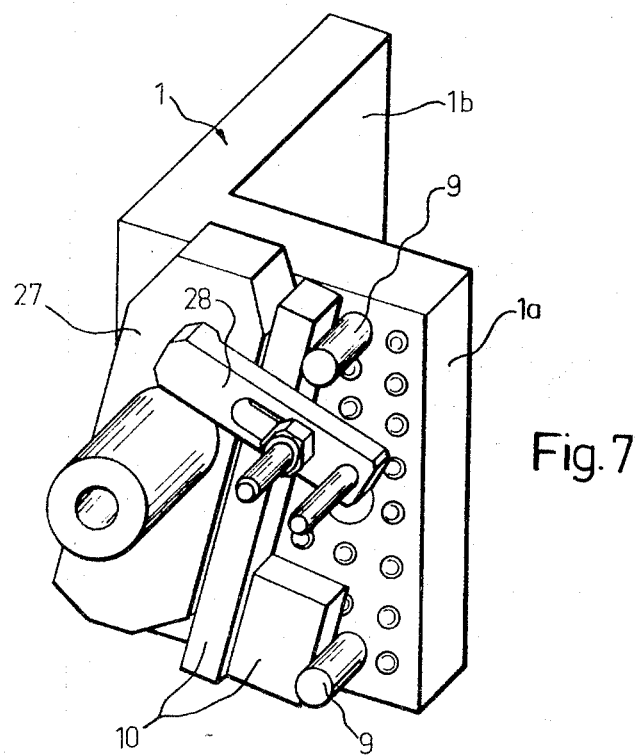

FIGS. 6 and 7 illustrate some practical applications of angle plate 1. By using two reference pins 9, in association with gauge blocks 10 and clamps 28, various devices or components, such as 26 and 27, can be positioned in a desired angular orientation on angle plate 1 in accordance with the sine principle.

While specific embodiments of the invention have been shown and described to illustrate the application of the principles of the invention, it will be understood that the invention may be embodied otherwise without departing from such principles.

What is claimed is:

1. A sine device comprising, in combination:
    an angle plate including a horizontal leg and a vertical leg each having a generally planar configuration and fixed perpendicularly to each other;
    a tiltable table including a planar base plate having generally parallel opposite surfaces and a bearing plate fixed to said base plate in a position extending generally perpendicular thereto;
    means for adjustably mounting said table upon said vertical leg with said base plate extending therefrom on one side thereof, said mounting means extending through said bearing plate and through said vertical leg to define a horizontal axis of rotation parallel to said base plate surfaces about which said table may be tilted to any one of a plurality of operative angles relative to said horizontal leg, and being operative to releasably secure said table at any of said operative angles;
    apertures selectively located in said vertical leg each spaced an equivalent distance from said horizontal axis;
    pin means adapted to be removably inserted in said apertures and to extend outwardly from said vertical leg on the same side thereof as said base plate; and
    a plurality of gauge blocks;
    said apertures being located to enable direct abutment of said pin means inserted therein with the one of said surfaces of said table nearer said horizontal axis to support said table in particular ones of said plurality of operative positions;
    said gauge blocks being configured and sized to enable insertion thereof between said pin means and said nearer one of said surfaces of said base plate to fully occupy any space there-between and to thereby enable support of said base plate by said pin means when said base plate is located in operative positions other than said particular ones wherein said nearer one of said surfaces of said base plate is in direct abutment with said pin means, said gauge blocks each having a predetermined gauging dimension which is equivalent to the product of a trigonometric function of the operative angle at which said tiltable table is to be located and the distance between said apertures and said axis of rotation.

2. A sine device according to claim 1, comprising means for mounting a sine table on the further surface of said base plate including means forming a pivoting axis for said sine table, said pivoting axis extending parallel to said further surface of said base plate whereby said sine table and said device comprise, in combination, a compound sine table.

* * * * *